United States Patent Office 3,254,299
Patented May 31, 1966

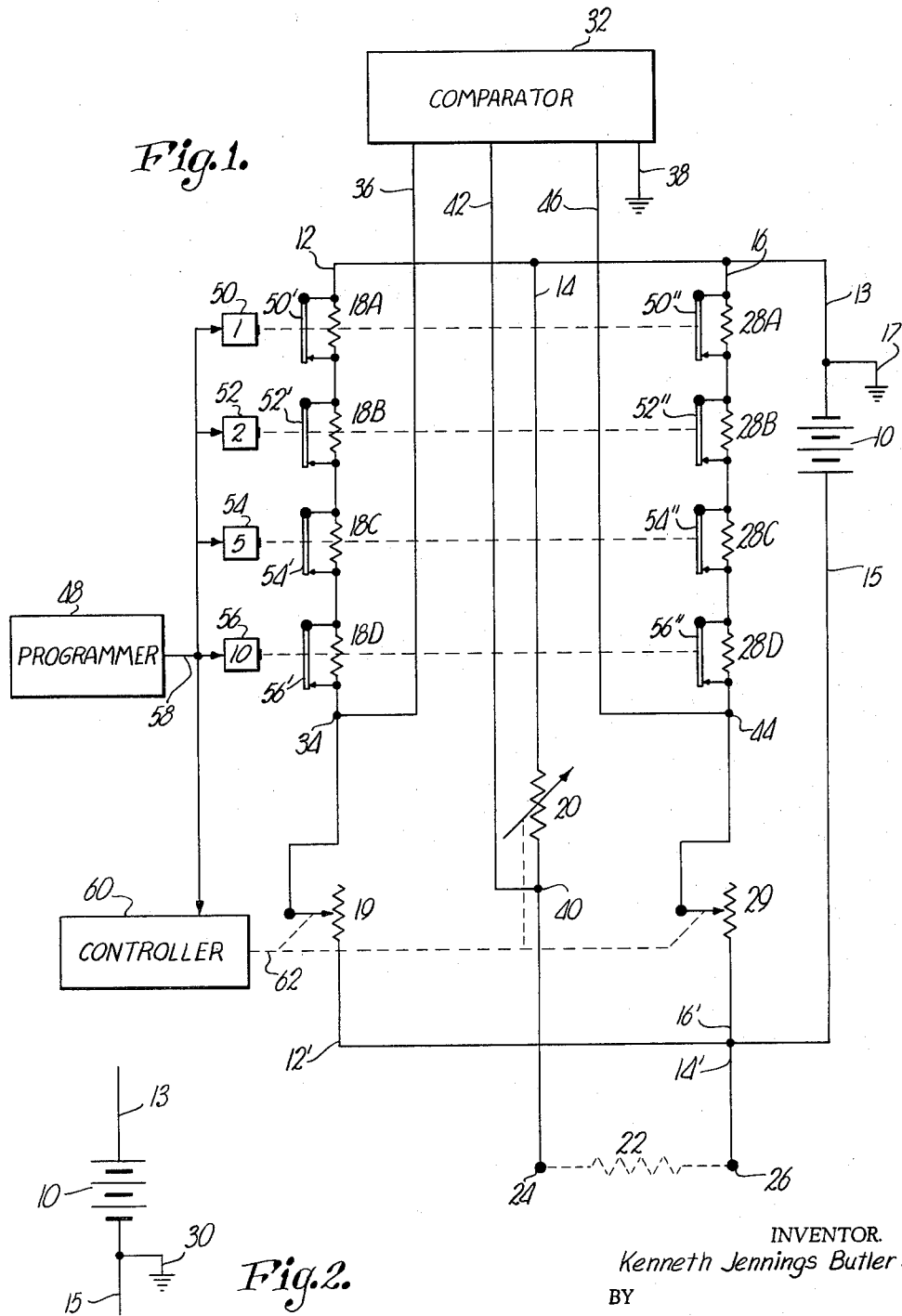

3,254,299
APPARATUS FOR DETERMINING CONFORMITY OF RESISTANCE VALUE TO PERCENTAGE TOLERANCE LIMITS
Kenneth Jennings Butler, Jr., Lawrence, Kans., assignor to Dit-MCO, Inc., Kansas City, Mo., a corporation of Missouri
Filed May 10, 1962, Ser. No. 193,769
4 Claims. (Cl. 324—62)

This invention relates generally to resistance testers and, more specifically, to means for determining the conformity of a resistance under test to percentage tolerance limits.

In the electrical testing art, there has heretofore been a need for a device capable of making rapid checks of the ohmic value of resistances. Such checks are in the nature of tolerance tests to ascertain if the value of a resistance under test conforms to tolerance limits. A common approach is to compare the voltage drop across a resistance under test with the voltage drop across resistances of known value which correspond to the upper and lower tolerance limits of the resistance under test. Such is frequently accomplished by programming the values of said know resistances so that rapid checks of a number of resistances may be made.

In the automatic circuit tester art, such tests are often effected on components in circuit modules or other devices under test. The approach aforesaid obviously necessitates pretest calculation of the tolerance limits of the various components to be tested. The elimination of these calculations, of course, would greatly facilitate the setting up of testing programs.

It is, therefore, an object of this invention to provide a means of checking the value of resistances for conformity to percentage tolerance limits without calculating the ohmic value of said limits.

It is another object of this invention to provide a means for determining the conformity of the value of a resistance to percentage tolerance limits by comparing the voltage drop across the resistance under test with voltages corresponding in value to said limits.

It is another object of this invention to effect the test as described in the above-mentioned object without calculating the ohmic value of said limits for each resistance tested.

It is still another object of this invention to facilitate the programming of automatic circuit testers by providing apparatus to enable said testers to check the conformity of a number of resistances by introducing into the logic circuitry information only as to the rated values of the resistances to be checked and the percentage tolerances thereof, and to accomplish this end using a minimum of components in the testing apparatus.

Other objects will become apparent as the detailed description proceeds.

In the accompanying drawings:
FIGURE 1 is a schematic diagram of an embodiment of the present invention; and
FIG. 2 is a schematic diagram showing a modification of the embodiment shown in FIG. 1.

Referring to FIG. 1, a power source 10 is shown connected across three resistance legs 12–12', 14–14', and 16–16' by leads 13 and 15, lead 13 being grounded as at 17. Legs 12–12' comprises resistances 18A, 18B, 18C, 18D, and 19. Leg 14–14' comprises resistance 20 connected in series with the resistance under test 22 at testing terminal 24, said resistance under test 22 being connected across testing terminal 24 and testing terminal 26. Leg 16–16' comprises resistances 28A, 28B, 28C, 28D and resistance 29.

A voltage comparator 32 is utilized to compare the voltage drop across resistance 20 with the voltages appearing across resistances 18A–D and 28A–D. The voltage comparator 32 may be a conventional voltage comparing device adapted to have an unknown voltage and a high and low reference voltage applied thereto and to indicate whether the unknown voltage is between, below, or above the reference voltages. Comparator 32 is connected across resistances 18A–D at junction point 34 and ground 17 by lead 36 and a ground connection 38, connected across resistance 20 at junction point 40 and ground 17 by lead 42 and ground connection 38, and is connected across resistances 28A–D at junction point 44 and ground 17 by lead 46 and ground connection 38. Thus, it may be seen that comparator 32 receives the voltages across resistances 18A–D, resistance 20, and resistances 28A–D.

Referring to FIG. 2, the modified embodiment shows lead 15 grounded as at 30 rather than lead 13 grounded as at 17, as shown in FIG. 1. Therefore, in the embodiment shown in FIG. 2, the comparator 32 is connected across resistances 19 and 29 and the resistance under test 22 by leads 36, 46 and 42, respectively, and ground connection 38.

A programmer 48 programs the energization of relay coils 50, 52, 54 and 56 through electrical coupling means 58. Programmer 48, furthermore, programmably commands controller 60 through electrical coupling means 58. Programmer 48 is a conventional device and may be a binary coded tape programmer widely used in the automatic circuit testing art. Controller 60 is conventional apparatus and may be a variety of devices known in the electrical art. Controller 60 will be treated more fully hereinafter.

Relay coils 50, 52, 54 and 56 each actuate a pair of normally closed contacts. For relay coil 50, said contacts are designated 50' and 50", the primed and double-primed notation being used also for the contacts associated with relay coils 52, 54 and 56. Thus, energization by programmer 48 of any relay coil causes the opening of its associated pair of contacts. The opening of any of said pairs of contacts causes the resistances that said contacts are connected across to be placed in resistance legs 12–12' and 16–16'. The relay coils are further labeled with the numerals "1," "2," "5," and "10" to signify the percent tolerance limits for which the tester is set when a particular relay coil is energized.

It may be noted that resistance 20 is shown in the figure as variable and controllable by controller 60. This is to indicate that resistance 20 is variable in decade steps according to the rated value of the resistance under test 22. More specifically, resistance 20 would usually be capable of assuming a set of values such as 1, 10, 100, 1000, and 10,000 ohms. This may be accomplished by simple switching means (not shown), such as is illustrated for resistances 18A–D and 28A–D.

As aforesaid, the controller 60 may be a variety of conventional devices. Specifically, controller 60 could be a digital rheostat device similar in design to the digital switching concepts discussed and described in my copending application, Serial No. 193,753, filed May 10, 1962. It is evident, therefore, and should be understood that the controller 60, coupling means 62, and resistances 19 and 29 are purely diagrammatic representations of structure well within the design capabilities of one skilled in the art.

Furthermore, the significance of the interaction of resistances 19 and 29 with resistance 20 through controller 60 should be understood. Digital rheostats such as may be employed to control the values of resistances 19 and 29 become proportionally complex as the decade range of these rheostats is increased. This, of course, greatly increases the cost of the entire testing apparatus. Therefore, the present invention provides means whereby the number of decades need only be equal to the number of significant digits other than zero in the rated values of the resistances to be tested. This is accomplished by making resistance 20 variable by decades as aforesaid and responsive to controller 60. The details surrounding this feature of the invention will become apparent as the operation of the invention is fully described.

The operation is best illustrated by an example. Assume that the digital values of resistances 19 and 29 over a three decade range is sufficient, as would generally be the case. For most purposes, three decades will cover as wide a range of resistance values as will be encountered.

The values of resistances 18A–D and 28A–D are based on one of the several values of resistance 20. Assume that this base value is 1,000 ohms, resistance 20 being variable by decades from a minimum of 1 ohm to a maximum, in normal use, of 100K. Therefore, in the example, 18A and 28A equal 990 and 1010 ohms, respectively, these values being 1% less and 1% more than the base value of 1,000 ohms. This, of course, corresponds to a tolerance limit of plus or minus 1%. The other resistances 18B–D and 28B–D are exactly 2%, 5% and 10% less or more than said base value, respectively.

Assume that a resistance to be tested 22 having a rated value of 5,000 ohms is acceptable if the actual value thereof is plus or minus 5% of the rated value. This rated value and tolerance is placed on such means as binary coded programming tape and introduced into the reader of programmer 48. In actual practice, a series of such bits of information would be introduced into the programmer, but it is assumed, for purposes of illustration, that only one resistance 22 is desired to be tested.

The programmer 48 reads the programming tape and, through electrical coupling means 58, causes the energization of relay coil 54 thus opening contacts 54' and 54" and placing resistances 18C and 28C in resistance legs 12–12' and 16–16', respectively. Simultaneously with the tolerance command, the programmer 48 through electrical coupling means 58 delivers a digit and decade command to controller 60 corresponding to the first three digits and the number of decades in the number representing the rated value of resistance 22. Controller 60 is linked with resistances 19 and 29 by coupling means 62 and adjusts the value of resistances 19 and 29 to 50,000 ohms and sets the value of resistance 20 at 100 ohms.

At this point, it is important to note that the digit (5–0–0) and decade command from programmer 48 caused 50,000 ohms to be placed in resistances 19 and 29. Simultaneously, the value of resistance 20 was set at 100 ohms. This was done to maintain the ratio of the values of resistances 19 and 29 to the base value of resistances 18C and 28C equal to the ratio of the rated value of resistance 22 to the value of resistance 20. If it were not for this equal ratio correspondence, it would be necessary for resistances 19 and 29 to be variable ohmically over as wide a decade range as all possible ohmic values of resistances 22 to be tested. However, the feature of providing variation by decades in the value of resistance 20 enables resistances 19 and 29 to be much less complex as aforesaid.

As described previously, in FIG. 1 the voltages across resistances 18C, 20 and 28C are fed to the comparator 32. It may be appreciated that the comparator "sees" a voltage level produced across resistance 18C that represents the high tolerance limit and a voltage across resistance 28C that represents the low tolerance limit. The voltage across resistance 20 is compared with said limits in comparator 32 and an indication given as to whether the voltage across resistance 20 falls between the high and low voltage tolerance levels. Although the resistance (5100 ohms if resistance 22 equals its rated value) in resistance leg 14–14' is much less than the resistance in legs 12–12' and 16–16', the potential difference across all legs is the same, and, therefore, the voltage across resistance 20 will lie between said voltage limits if the value of resistance 22 is within the percent tolerance limit because of the aforesaid equal ratio correspondence of the resistances within the resistance legs.

It should be understood at this juncture, however, that the tolerance limits determined by the voltage drops across particular resistances 18A–D and 28A–D are not in exact correspondence with the tolerance percentages they represent. This error, however, is negligible, as may be seen by the relationship $$\frac{\Delta}{1+\Delta} \cong \Delta$$

where $\Delta$ equals the tolerance percentage expressed as a decimal. Thus, in practice, the ohmic values of resistances 18A–D and 28A–D may be selected in accordance with percentage deviations from the base value as set forth hereinabove.

It is evident that for values of resistances 19 and 29 variable between the limits of 10,000 ohms and 99,900 ohms that any resistance 22 to be tested having a rated value in this range will require resistance 20 to be set at its base value of 1,000 ohms. However, as illustrated above, for rated values of resistance 22 outside of the ohmic range of resistances 19 and 29, the value of resistance 20 is variable by factors of ten to maintain equal ratios within the resistance legs. It should be understood that digital correspondence between resistances 19 and 29 and the rated value of resistance 22 is not needed for the tester to be operable as other proportional relationships other than factors of ten will produce equal results. Digital correspondence, however, greatly simplifies the programming of the testing apparatus, a feature valuable in the programming of high speed automatic circuit testers.

The embodiment of the invention shown in FIG. 2 may be utilized if it is desired to compare the voltage across resistance 22 with the voltages across resistance 19 and 29. In practice, using either embodiment, comparator 32 gives a "go," "no go high" or "no go low" indication depending on whether the resistance under test 22 conforms to the tolerance limits. In automatic circuit testers a "go" signal would cause programmer 48 to advance to the next test.

In summary, the invention here described provides a simple means for determining the conformity of the value of a resistance to percentage tolerance limits. Without calculating the ohmic values of said limits, the invention provides a conformity determination over a theoretically infinite range of resistance values. From knowledge of the rated value of the resistance under test and the percent allowable tolerance only, the conformity may be ascertained.

It should be understood that although the invention has been above described as operable by a binary coded tape programmer, the use of such operating means is not intended to be a limitation in the operation of this invention. It is only important in the practice of the invention that means be provided to insert the appropriate values of resistance in the resistances 18A to D and 28A to D according to the percentage tolerance value for the resistance 22 to be tested and simultaneously to insert the appropriate values of resistance in the resistances 19, 20 and 29 according to the rated resistance value for the resistance 22. Furthermore, it is evident that as many resistances, generally designated 18 and 28, may be used depending on the number of preset tolerance limits desired.

Having thus described the invention, what is claimed as new and desired to be secured by Letters Patent is:

1. Apparatus for determining the conformity of the ohmic value of a resistor under test to the rated value thereof within a percentage tolerance limit comprising:
a source of electrical power;

a first variable resistor having a predetermined base value;
means for connecting said first resistor in series with the resistor under test and for connecting said first and test resistors across the output of said power source;
a second resistor having an ohmic value equal to said rated value times a predetermined factor;
a third resistor having an ohmic value substantially equal to the algebraic sum of said base value and the product of said base value and said tolerance percentage;
means connecting said second and third resistors in series across said power source;
means coupled with said first resistor for varying the latter to set the resistance thereof at an ohmic value equal to said base value divided by said factor; and
means for comparing the voltage drops across either said first and third resistors, or said second resistor and the resistor under test.

2. Apparatus for determining the conformity of the ohmic value of a resistor under test to the rated value thereof within upper and lower percentage tolerance limits comprising:
a source of electrical power;
a first variable resistor having a predetermined base value;
means for connecting said first resistor in series with the resistor under test and for connecting said first and test resistors across the output of said power source;
second and third resistors each having an ohmic value equal to said rated value times a predetermined factor;
a fourth resistor having an ohmic value substantially equal to the algebraic sum of said base value and the product of said base value and one of said tolerance limits;
a fifth resistor having an ohmic value substantially equal to the algebraic sum of said base value and the product of said base value and the other of said tolerance limits;
means connecting said second and fourth resistors in series across the output of said power source;
means connecting said third and fifth resistors in series across the output of said power source;
means coupled with said first resistor for varying the latter to set the resistance thereof at an ohmic value equal to said base value divided by said factor; and
means for comparing the voltage drops across either said first, fourth, and fifth resistors, or said second and third resistors and the resistor under test.

3. Apparatus for determining the conformity of the ohmic value of a resistor under test to the rated value thereof within upper and lower percentage tolerance limits, said apparatus comprising:
a source of electrical power;
a first variable resistor having a predetermined base value;
means for connecting said first resistor in series with the resistor under test and for connecting said first and test resistors across the output of said power source;
second and third variable resistors;
means coupled with said second and third resistors for adjusting each of the same to an ohmic value equal to said rated value times a predetermined factor;
fourth and fifth variable resistors;
means coupled with said fourth resistor for adjusting the resistance thereof to an ohmic value substantially equal to the algebraic sum of said base value and the product of said base value and one of said tolerance limits;
means coupled with said fifth resistor for adjusting the resistance thereof to an ohmic value substantially equal to the algebraic sum of said base value and the product of said base value and the other of said tolerance limits;
means connecting said second and fourth resistors in series across the output of said power source;
means connecting said third and fifth resistors in series across the output of said power source;
means coupled with said first resistor for varying the latter to set the resistance thereof at an ohmic value equal to said base value divided by said factor; and
means for comparing the voltage drop across said first resistor with the voltage drops across said fourth and fifth resistors.

4. Apparatus for determining the conformity of the ohmic value of a resistor under test to the rated value thereof within upper and lower percentage tolerance limits, said apparatus comprising:
a source of electrical power;
a first variable resistor having a predetermined base value;
means for connecting said first resistor in series with the resistor under test and for connecting said first and test resistors across the output of said power source;
second and third variable resistors;
means coupled with said second and third resistors for adjusting each of the same to an ohmic value equal to said rated value times a predetermined factor;
fourth and fifth variable resistors;
means coupled with said fourth resistor for adjusting the resistance thereof to an ohmic value substantially equal to the algebraic sum of said base value and the product of said base value and one of said tolerance limits;
means coupled with said fifth resistor for adjusting the resistance thereof to an ohmic value substantially equal to the algebraic sum of said base value and the product of said base value and the other of said tolerance limits;
means connecting said second and fourth resistors in series across the output of said power source;
means connecting said third and fifth resistors in series across the output of said power source;
means coupled with said first resistor for varying the latter to set the resistance thereof at an ohmic value equal to said base value divided by said factor; and
means for comparing the voltage drop across the resistor under test with the voltage drops across said second and third resistors.

References Cited by the Examiner

UNITED STATES PATENTS

| | | | |
|---|---|---|---|
| 2,468,625 | 4/1949 | Goetz | 324—62 |
| 2,925,554 | 2/1960 | Hayes | 324—57 |
| 2,934,699 | 4/1960 | Offner | 324—57 |
| 3,065,414 | 11/1962 | Sears | 324—57 X |

OTHER REFERENCES

Radio-Electronics (periodical), July 1956, pages 55–57.

WALTER L. CARLSON, *Primary Examiner.*

W. H. BUCKLER, C. A. S. HAMRICK,
*Assistant Examiners.*